(12) United States Patent
Wang et al.

(10) Patent No.: US 7,654,868 B1
(45) Date of Patent: Feb. 2, 2010

(54) CARD CONNECTOR

(75) Inventors: Chin-Chou Wang, Taipei Hsien (TW);
Chung-Hsin Huang, Taipei Hsien (TW);
Mei-Chuan Yang, Taipei Hsien (TW)

(73) Assignee: Cheng Uei Precision Industry Co., Ltd.

( * ) Notice: Subject to any disclaimer, the term of this patent is extended or adjusted under 35 U.S.C. 154(b) by 0 days.

(21) Appl. No.: 12/184,589

(22) Filed: Aug. 1, 2008

(51) Int. Cl.
*H01R 24/00* (2006.01)

(52) U.S. Cl. ........................... 439/630; 439/862

(58) Field of Classification Search ............... 439/630, 439/862
See application file for complete search history.

(56) References Cited

U.S. PATENT DOCUMENTS 5,885,090 A * 3/1999 Comstock et al. ............. 439/65
D419,133 S * 1/2000 Yoshida et al. ............. D13/120
6,293,805 B1 * 9/2001 Wu ............................. 439/66
2003/0186588 A1* 10/2003 Matsunaga et al. .......... 439/630

* cited by examiner

*Primary Examiner*—Renee S Luebke
*Assistant Examiner*—Larisa Tsukerman
(74) *Attorney, Agent, or Firm*—WPAT, P.C.; Anthony King; Kay Yang (57) ABSTRACT

A card connector is disclosed that includes an insulating housing and a plurality of contacts. The insulating housing defines a plurality of contact slots. Each of the contact slots extends outwardly and laterally to opposite sides to form two resisting protrusions respectively, wherein each of the resisting protrusions forms a resisting surface extending obliquely and inwardly from one side thereof. The contacts are respectively received in the contact slots of the insulating housing. Each of the contacts has a contact portion protruding upwardly for being pressed by a card and the contact portion is connected with a bearing portion resisting against the resisting surface for preventing the contact portion from flipping upwardly out of the insulating housing.

4 Claims, 9 Drawing Sheets

CARD CONNECTOR

BACKGROUND OF THE INVENTION

1. Field of the Invention

The present invention generally relates to a card connector, and more particularly to a card connector adapted for a Subscriber Identity Model (SIM) card.

2. The Related Art

Card connectors are broadly used in many electronic devices such as mobile phones, digital cameras and so on for transmitting data between the electronic devices and memory cards received in the electronic devices.

Figure 11:
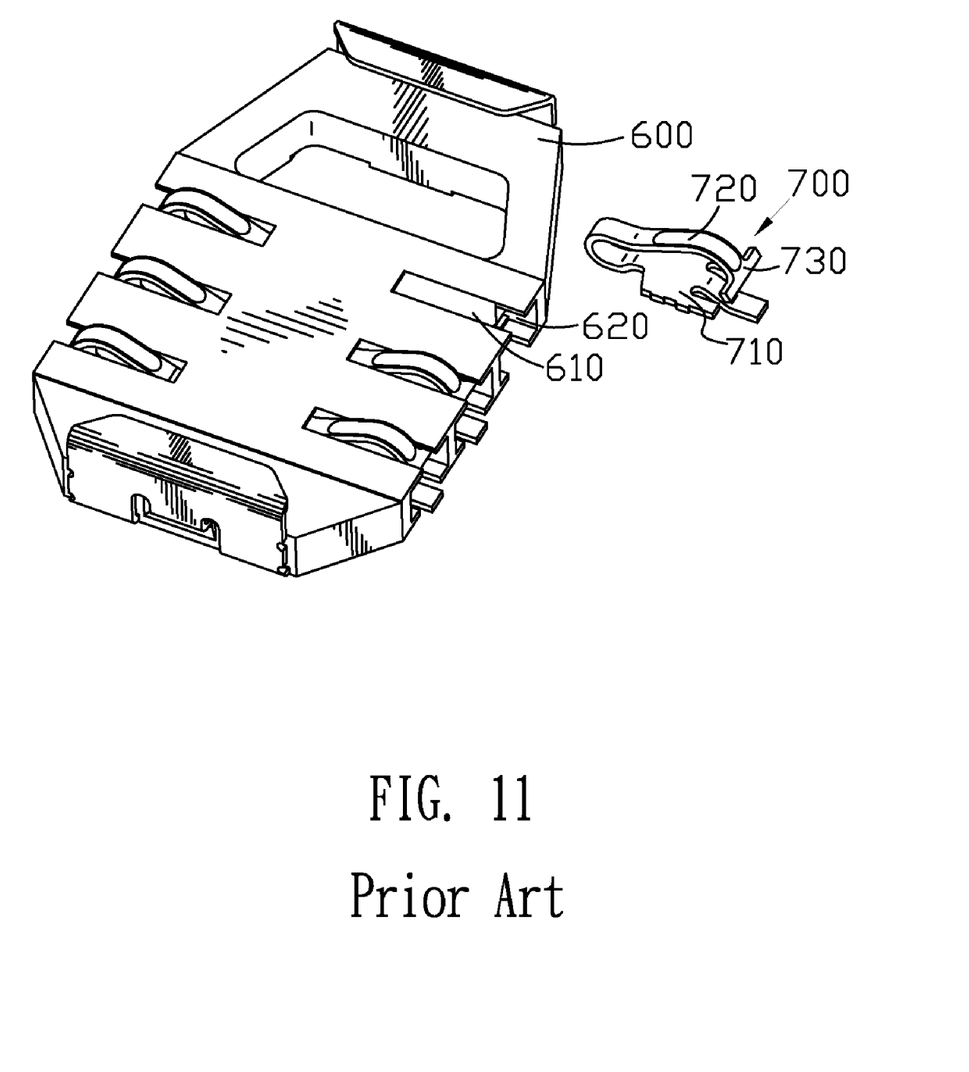
FIG. 11 is a perspective view of a prior card connector of which one of contacts is withdrawn therefrom.

Referring to FIG. 11, a conventional card connector is shown. The card connector includes an insulating housing 600 and a plurality of contacts 700 that are received in the insulating housing 600. The insulating housing 600 defines a plurality of contact slots 610 and pairs of halting gaps 620 all of which are divided into two groups with one group disposed in a front portion of the insulating housing 600 and the other group in a rear portion thereof. Each pair of the halting gaps 620 communicates with lateral sides of each corresponding contact slot 610. Each of the contacts 700 has a base portion 710 received in the contact slot 610, a vaulted contact portion 720 disposed above the base portion 710 and protruding out of the contact slot 610 for connecting with a memory card inserted in the card connector and a clasping portion 730 slantways extending downward from a free end of the contact portion 720. Two ends of the clasping portion 730 are respectively disposed in one pair of the halting gaps 620 for preventing the free end of the contact portion 720 from flipping out of the insulating housing 600. The two ends of the clasping portion 730 are capable of moving up and down in the halting gaps 620.

However, in use, when the memory card is inserted into the card connector, the memory card presses the contact portions 720 of the contacts 700 downward for realizing electrical connection, which causes the clasping portions 730 moving toward the base portions 710. If the insulating housing 600 is too thin, the space of the halting gaps 620 in which the clasping portions 730 move will become too small. Then the small space will cause the clasping portions 730 contact the base portions 710 or make the memory card difficult to be inserted in the card connector. Therefore, the data transmission between the memory card and an electronic device holding the card connector therein is affected adversely. For solving the problem, the thickness of the insulating housing 600 is designed to be increased to enlarge the space of the halting gaps 620. Thereby, the volume of the card connector is enlarged accordingly and the miniaturization of the electronic device is inevitably affected.

SUMMARY OF THE INVENTION

Accordingly, an object of the present invention is to provide a card connector capable of being miniaturized. To achieve the above mentioned object, the card connector includes an insulating housing and a plurality of contacts. The insulating housing defines a plurality of contact slots. Each of the contact slots extends outwardly and laterally to opposite sides to form two resisting protrusions respectively, wherein each of the resisting protrusions forms a resisting surface extending obliquely and inwardly from one side thereof. The contacts are respectively received in the contact slots of the insulating housing. Each of the contacts has a contact portion protruding upwardly for being pressed by a card and the contact portion is connected with a bearing portion resisting against the resisting surface for preventing the contact portion from flipping upwardly out of the insulating housing.

To realize the above mentioned object, the card connector includes an insulating housing and a plurality of contacts. The insulating housing defines a plurality of contact slots. Each of the contact slots extends outwardly and laterally to opposite sides to form two resisting protrusions respectively. Each of the resisting protrusions defines a receiving cavity in a bottom portion thereof. The contacts are respectively received in the contact slots of the insulating housing. Each of the contacts has a contact portion protruding upwardly for being pressed by a card. The contact portion is connected with a bearing portion received in the receiving cavity for preventing the contact portion from flipping upwardly out of the insulating housing.

As described above, because each of the resisting protrusions of the insulating housing defines the inclined resisting surface or the receiving cavity thereon to mate with the bearing portion connected with the contact portion, the space in which the bearing portion moves is increased accordingly. Therefore, it is impossible for the bearing portions to contact other portions of the contacts, which ensures stable data transmission and achieves size reduction of the card connector.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
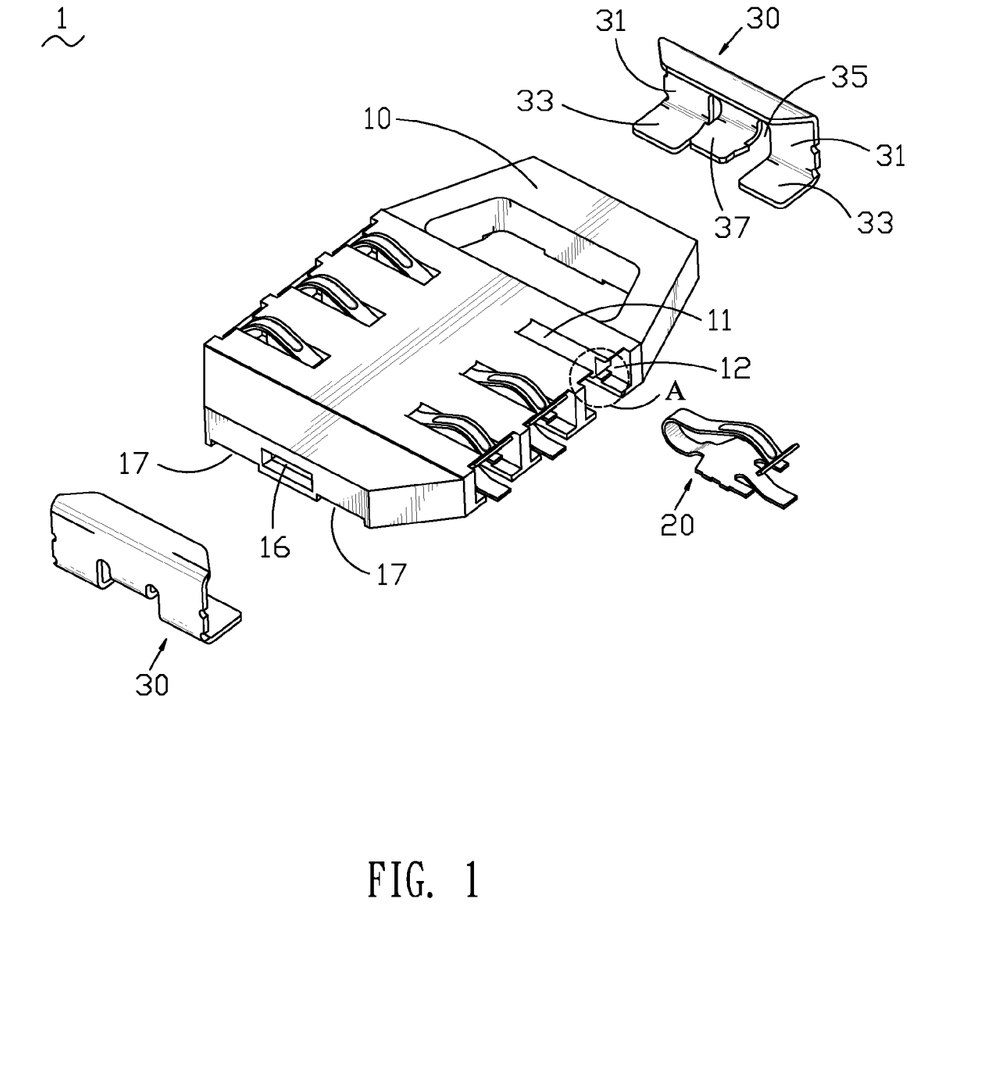
FIG. 1 is a perspective view of a card connector of which one of contacts and two retaining members are withdrawn therefrom according to a first embodiment of the present invention.
Figure 2:
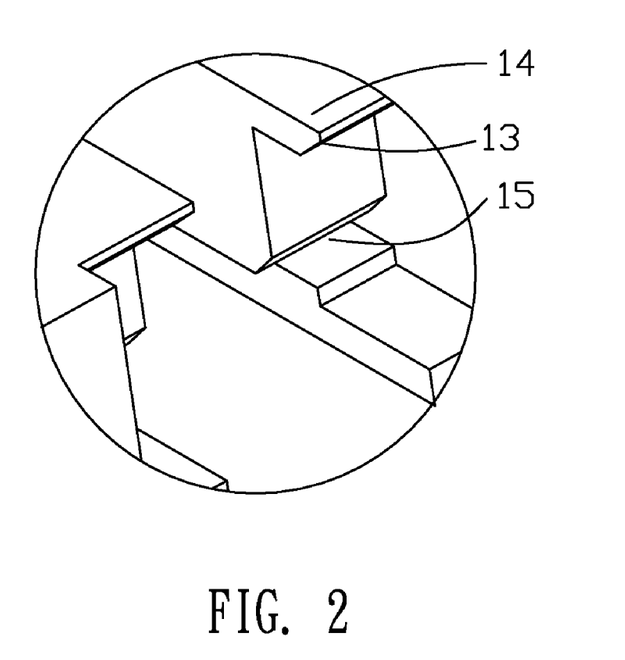
FIG. 2 is a partially enlarged view of the encircled portion labeled A of FIG. 1.
Figure 3:
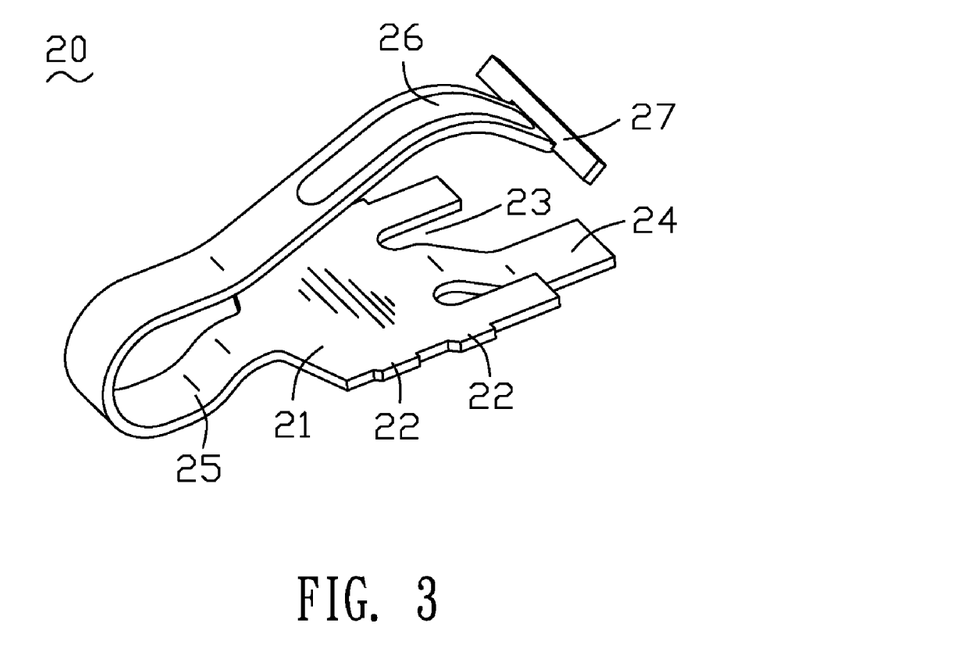
FIG. 3 is a perspective view of the contact of the card connector of FIG. 1.

Referring to FIG. 1 to FIG. 3, a card connector 1 adapted for a Subscriber Identity Model (SIM) card according to a first embodiment of the present invention includes an insulating housing 10, a plurality of contacts 20 is disposed in a front portion and a rear portion of the insulating housing 10 respectively and two retaining members 30 are disposed in two opposite side ends of the insulating housing 10.

With reference to FIG. 1 and FIG. 2, the insulating housing 10 is of substantially a flat board-shape and defines a plurality of contact slots 11 divided into two groups. One group of the contact slots 11 is defined at the front portion of the insulating housing 10, while the other group of the contact slots 11 is arranged at the rear portion thereof. The insulating housing 10 further defines pairs of receiving recesses 15 at a bottom portion thereof. Each pair of the receiving recesses 15 is disposed at lateral sides of each corresponding contact slot 11 and communicates with the contact slot 11. The insulating housing 10 also defines pairs of gaps 12 at the front portion and the rear portion thereof and passing therethrough and at the same time passing a top portion thereof. Each pair of the gaps 12 is disposed at the lateral side of each corresponding contact slot 11 and communicates with the corresponding receiving recesses 15 and the contact slot 11. Each of the contact slots 11 extends outwardly and laterally to opposite sides to form two resisting protrusions 14 respectively. Each resisting protrusion 14 covers an upper portion of the corresponding gap 12 and defines a resisting surface 13 at a free end thereof. The resisting surface 13 is inclined downward and inward. Each side end of the insulating housing 10 defines a locating cavity 16 at a middle portion thereof and two receiving grooves 17 at lateral sides of the locating cavity 16 and passing through the bottom portion of the insulating housing 10.

Referring to FIG. 1 and FIG. 3, each of the contacts 20 has a base portion 21 received in the contact slot 11 and one pair of the receiving recesses 15 of the insulating housing 10. Two pairs of protruding lumps 22 project outward from opposite sides of the base portion 21. A front portion of the base portion 21 defines a U-shaped opening 23. The base portion 21 defines a soldering portion 24 slantways extending frontward in the middle of the opening 23 and horizontally extending out of the contact slot 11 of the insulating housing 10. A U-shaped connecting portion 25 received in the contact slot 11 extends rearward from the middle of a rear portion of the base portion 21 and extends frontward. A vaulted contact portion 26 is connected to the connecting portion 25 and located over the base portion 21. The contact portion 26 protrudes out of the contact slot 11. A tip end of the contact portion 26 perpendicularly connects with a middle portion of a bearing portion 27. The bearing portion 27 extends upward. Both ends of the bearing portion 27 respectively resist against the resisting surfaces 13 of one pair of the resisting protrusions 14 for preventing the tip end of the contact portion 26 from flipping out of the insulating housing 10. The two ends of the bearing portion 27 are capable of moving up and down in one pair of the gaps 12.

With reference to FIG. 1 again, each of the retaining members 30 has an erect supporting portion 31. The bottom of the supporting portion 31 extends sideward to form two lower fixing portions 33 located in the two receiving grooves 17 defined in one side end of the insulating housing 10 for fixing the insulating housing 10. A notch 35 is defined in the middle of the supporting portion 31 and passes through the bottom of the supporting portion 31. An upper fixing portion 37 extends downward and extends sideward from the bottom of the notch 35 and is disposed in the locating cavity 16 of the insulating housing 10.

Figure 4:
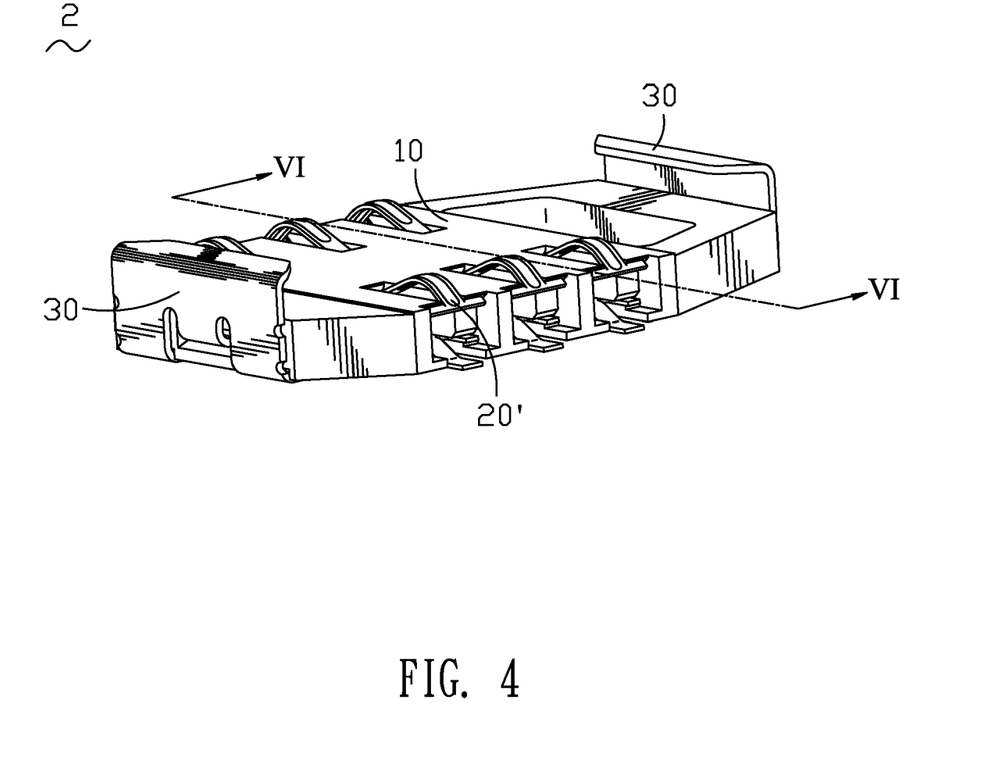
FIG. 4 is a perspective view of a card connector according to a second embodiment of the present invention.
Figure 5:
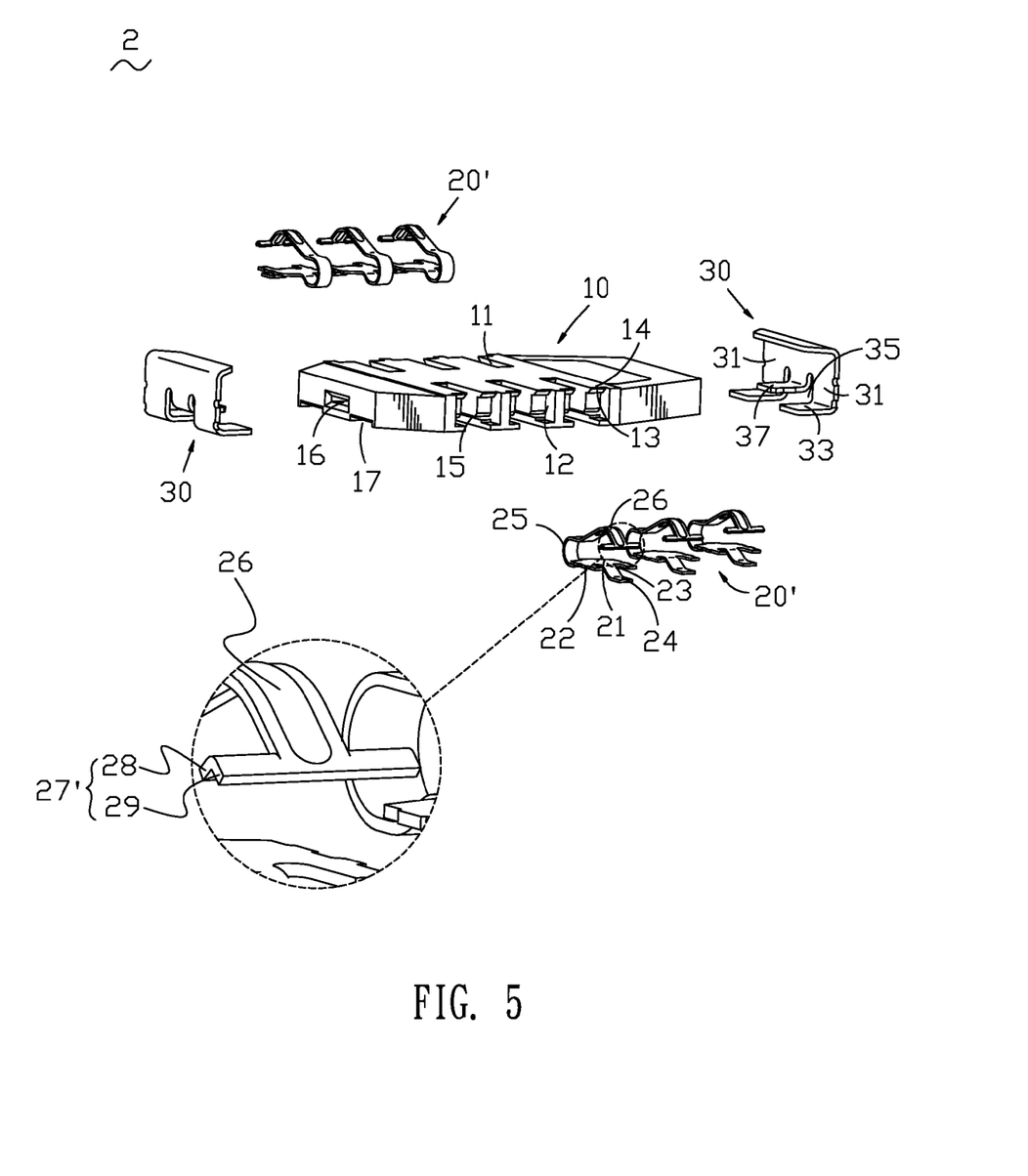
FIG. 5 is an exploded view of the card connector of FIG. 4.
Figure 6:
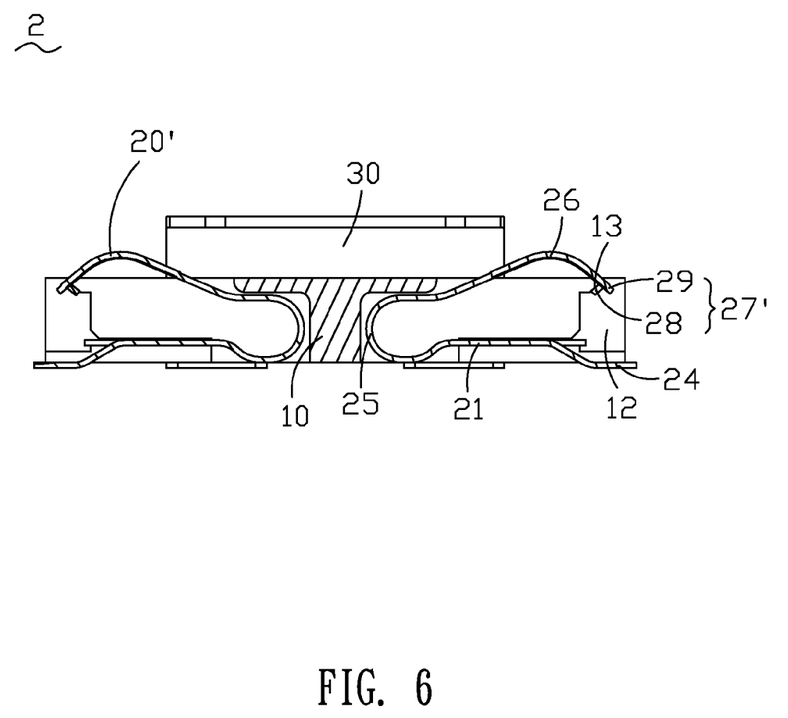
FIG. 6 is a cross-sectional view of the card connector taken along line VI-VI of FIG. 4.

Referring to FIG. 4 to FIG. 6, a card connector 2 according to a second embodiment of the present invention is shown. Comparing to the first embodiment, the difference is that the card connector 2 has plural contacts 20' which are different from the contacts 20 of the card connector 1 of the first embodiment. The difference therebetween will be described in detail hereinafter and the same construction between the card connector 2 and the card connector 1 will be omitted herefrom for simplicity and not be described anymore.

Referring to FIG. 5 and FIG. 6, similar to the contacts 20 of the card connector 1 of the first embodiment, each of the contacts 20' has the base portion 21, two pairs of the protruding lumps 22, the U-shaped opening 23, the soldering portion 24, the U-shaped connecting portion 25 and the vaulted contact portion 26. The tip end of the contact portion 26 connects with a middle portion of a bearing portion 27'. The bearing portion 27' is of substantially an inverted V-shape and has a resisting portion 28 perpendicular to the tip end of the contact portion 26 and extending downward and inward and a flank portion 29 extending downward and outward from the tip end of the contact portion 26 opposite to the resisting portion 28. Both ends of the resisting portion 28 of the bearing portion 27' respectively resist against the resisting surfaces 13 of one pair of the corresponding resisting protrusions 14 for preventing the tip end of the contact portion 26 from flipping out of the insulating housing 10. The bearing portion 27' is capable of moving up and down in one pair of the gaps 12.

Referring to FIG. 7 to FIG. 10, a card connector 3 according to a third embodiment of the present invention is shown. Compared to the second embodiment, the difference is that the card connector 3 has an insulating housing 10' different from the insulating housing 10 of the card connector 2. The difference therebetween will be described in detail hereinafter and the same construction between the card connector 3 and the card connector 2 will be omitted and not be described anymore.

Figure 7:
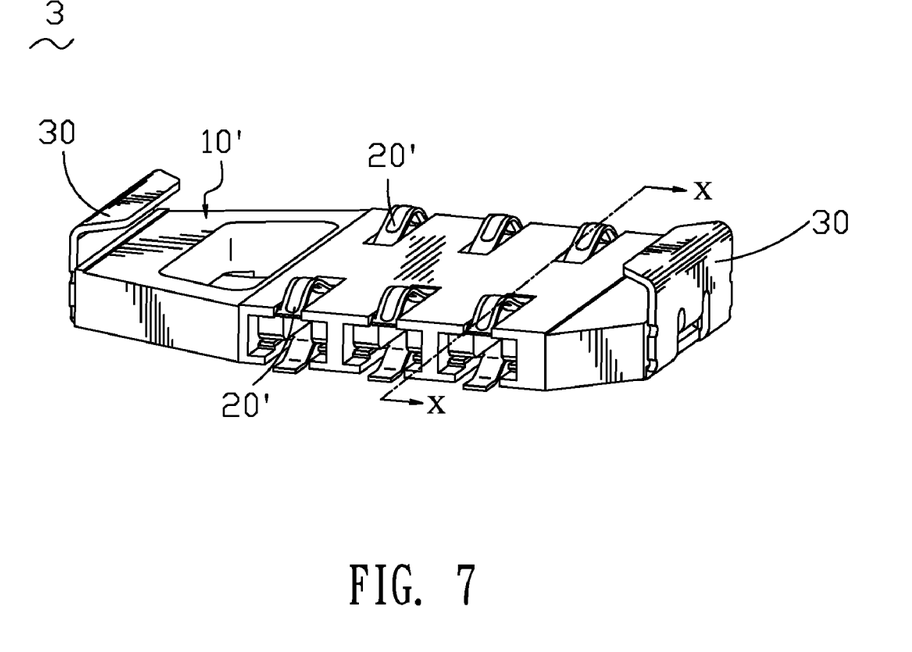
FIG. 7 is a perspective view of a card connector according to a third embodiment of the present invention.
Figure 8:
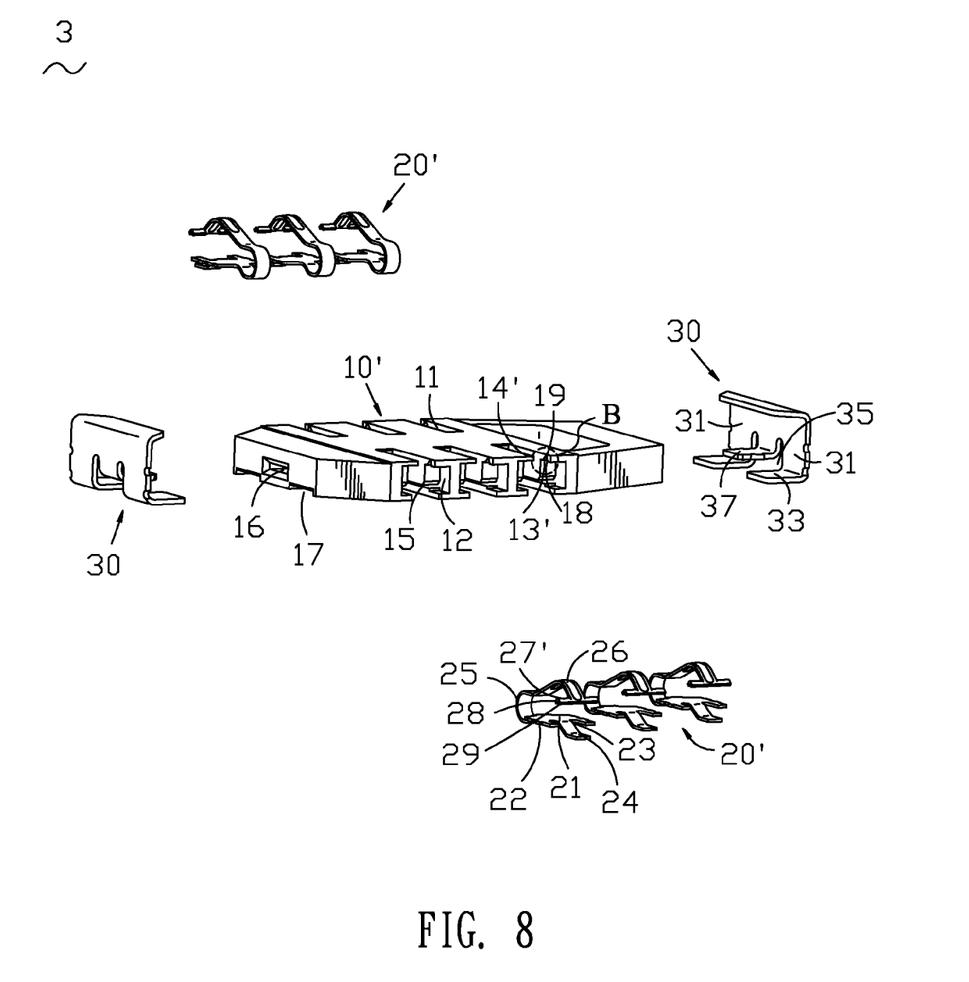
FIG. 8 is an exploded view of the card connector of FIG. 7.
Figure 9:
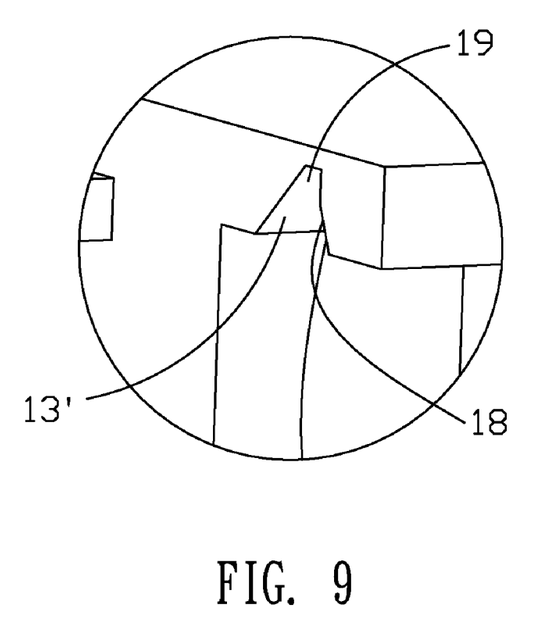
FIG. 9 is a partially enlarged view of the encircled portion labeled B of FIG. 8.
Figure 10:
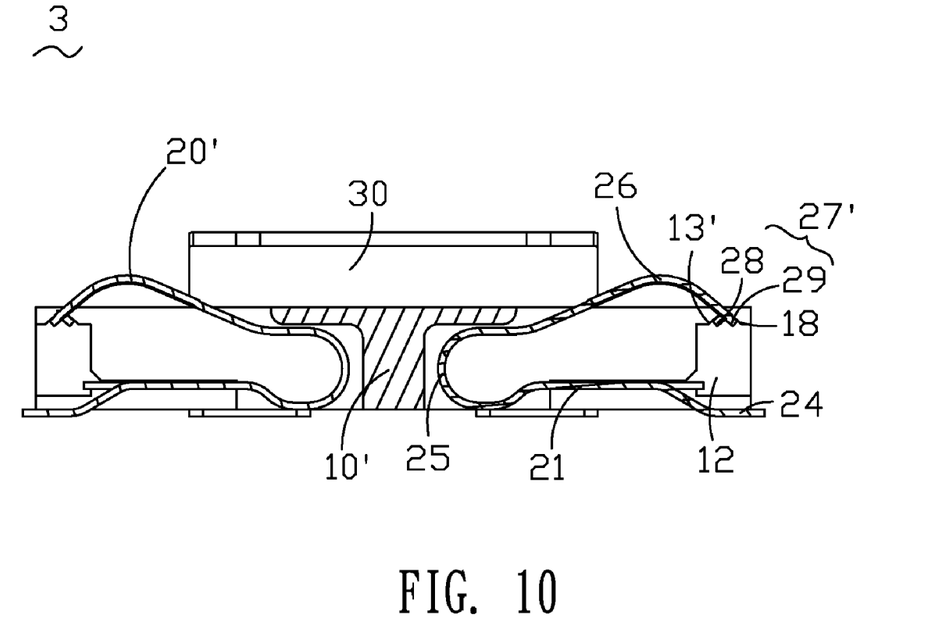
FIG. 10 is a cross-sectional view of the card connector taken along line X-X of FIG. 7.

Referring to FIG. 7 to FIG. 9, similar to the insulating housing 10 of the card connector 2 and the insulating housing 10 of the card connector 1, the insulating housing 10' of the card connector 3 defines a plurality of the contact slots 11, pairs of the receiving recesses 15 and pairs of the gaps 12. Each of the contact slots 11 extends outwardly and laterally to opposite sides to form two resisting protrusions 14' respectively. Each of the resisting protrusions 14' covers an upper portion of the corresponding gap 12 and defines a first resisting surface 13' extending downward and inward and a second resisting surface 18 extending frontward and downward in a bottom portion thereof. The first resisting surface 13' and the second resisting surface 18 define a substantially inverted V-shaped receiving cavity 19 therebetween in the gap 12. Each of side ends of the insulating housing 10' defines the locating cavity 16 and the receiving grooves 17. The ends of the bearing portions 27' of the contacts 20' are received in the receiving cavities 19. The resisting portions 28 and the flank portions 29 of the bearing portions 27' respectively resist against the first resisting surfaces 13' and the second resisting surfaces 18 for preventing the tip ends of the contact portions 26 from flipping out of the insulating housing 10'. The bearing portions 27' are capable of moving up and down in the gaps 12.

As described above, when in use, the contact portions 26 of the card connector 1, 2, 3 are compressed downward, so that the bearing portions 27, 27' are driven to be moved downward in the gaps 12. Because the resisting protrusions 14, 14' of the insulating housing 10, 10' define the inclined resisting surfaces 13, 13' thereon to mate with the bearing portions 27, 27' connecting with the tip ends of the contact portions 26, the spaces in which the bearing portions 27, 27' move are increased. Therefore, there is no likelihood that the bearing portions 27, 27' will contact the soldering portions 24, thereby ensuring stable data transmission and reducing the size of the card connector 1, 2, 3 largely.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card connector, comprising:
   an insulating housing defining a plurality of contact slots, each of the contact slots extending outwardly and laterally to opposite sides to form two resisting protrusions respectively, each of the resisting protrusions defining a receiving cavity in a bottom portion thereof; and
   a plurality of contacts respectively received in the contact slots of the insulating housing, each of the contacts having a contact portion protruding upwardly for being pressed by a card, the contact portion being connected with a bearing portion received in the receiving cavity for preventing the contact portion from flipping upwardly out of the insulating housing.

2. The card connector as claimed in claim 1, wherein the receiving cavity is of substantially an inverted V-shape and has a first resisting surface and a second resisting surface, the bearing portion received in the receiving cavity has a resisting portion extending downward and inward and a flank portion extending outward and downward opposite the resisting portion, the resisting portion resists against the first resisting surface and the flank portion resists against the second resisting surface.

3. The card connector as claimed in claim 1, wherein each of the corresponding two resisting protrusions and the contact slot cooperatively define a gap, where the bearing portion can move, the gap passes through a corresponding end portion of the insulating housing, the resisting protrusions are located above the corresponding gaps.

4. The card connector as claimed in claim 3, wherein the receiving cavity communicates with the corresponding gap.

* * * * *